United States Patent [19]

Whetstone

[11] Patent Number: 4,514,688
[45] Date of Patent: Apr. 30, 1985

[54] DIGITAL TABLET SYSTEM WITH CALIBRATION MEANS

[75] Inventor: Albert L. Whetstone, Stratford, Conn.

[73] Assignee: Summagraphics Corporation, Fairfield, Conn.

[21] Appl. No.: 162,311

[22] Filed: Jun. 23, 1980

[51] Int. Cl.³ .................. G01B 7/14; G08C 21/00
[52] U.S. Cl. ................................ 324/208; 178/18; 33/1 M
[58] Field of Search ................ 324/207, 208; 178/18–20; 33/1 M, 1 CC, 125 R, 125 W

[56] References Cited

U.S. PATENT DOCUMENTS

| | | | |
|---|---|---|---|
| 2,971,171 | 2/1961 | Powell | 333/148 |
| 3,173,131 | 3/1965 | Perucca | 333/148 |
| 3,648,277 | 3/1972 | Whetstone et al. | 178/18 |
| 4,028,619 | 6/1977 | Edwards | 324/208 |
| 4,071,818 | 1/1978 | Krisst | 324/208 |

Primary Examiner—Gerard R. Strecker
Assistant Examiner—Walter E. Snow
Attorney, Agent, or Firm—Daniel M. Rosen

[57] ABSTRACT

An improved position determination device utilizes an energized movable pointer which is inductively coupled to a grid of spaced parallel electrical conductors for each coordinate direction. The termini of the spaced conductors of each grid are traversed by a respective magnetostrictive element. Strain waves are propagated from the region where each magnetostrictive element is traversed by the respective energized conductors to a sensor and the time between arrival of the strain waves and the arrival of reference strain waves from reference points on the magnetostrictive elements is computed to determine the coordinates of the pointer.

21 Claims, 4 Drawing Figures

DIGITAL TABLET SYSTEM WITH CALIBRATION MEANS

The instant invention relates to devices for determining the coordinates of a pointer on the surface of a tablet. More specifically, the invention relates to position determining devices wherein the distance of a pointer from a predetermined reference point is determined by measuring time of travel of one or more magnetostrictively induced strain waves along a magnetostrictive element between a point corresponding to the pointer position and a point corresponding to the reference position.

BACKGROUND ART

It is known in the art of position determining devices sometimes referred to as digitizers to provide a tablet with a grid comprising a series of parallel equidistant magnetostrictive wires which are connected to a common transverse electrical conductor for exciting the magnetostrictive wire with a pulse of electrical current. In such devices the parallel magnetostrictive wires are arrayed parallel to the direction of the distance to be measured between the pointer and the reference origin. An electrical pulse is applied to the electrical conductor to excite the magnetostrictive wires and induce traveling strain waves along the wire. The apparatus for generating the electrical pulse is also used to start a timer. The pointer which may be a cursor or a stylus is provided with an inductive coil which generates a secondary pulse in response to the arrival of a strain wave on one or more of the adjacent magnetostrictive wires and the secondary pulse is used to stop the timer. The timer thus provides an indication of the time of travel of the strain wave from the origin to the pointer which is proportional to the distance of the pointer from the origin.

Magnetostrictive digitizers of the former type suffer from inaccuracies due to nonlinearities in the individual magnetostrictive wires. As a result of nonuniformities along the magnetostrictive wires as well as among the wires, it may take a magnetostrictive strain wave more or less time to traverse a length of one wire than to traverse the same length of a different portion of the same wire or of a different wire.

In order to overcome the problem of variations within and among magnetostrictive wires, digitizers have been constructed wherein a ratio is taken between the time of travel of the magnetostrictive strain wave between the pointer and reference point and the time of travel of the magnetostrictive strain wave along the entire length of each magnetostrictive wire and multiplied by a constant. Although the latter approach has proven to be more accurate than the former arrangement, it has not fully overcome the problems inherent in magnetostrictive digitizers which employ numerous magnetostrictive wires having variations within and among them. Such digitizers require large quantities of magnetostrictive wire to traverse the dimensions of the tablet usually in two coordinate directions, numerous times. The more magnetostrictive wire that is used, the greater the number of nonlinearities and variations and the more difficult it becomes to compensate for them. Increased cost and difficulty of manufacture are additional problems attending increases in the amount of magnetostrictive wire used. Additionally, in prior art digitizers, the surface of the tablet must be supported above the magnetostrictive wires if the surface is to receive a paper which is to be written upon, as pressure transmitted through the surface to the magnetostrictive wires is apt to interfere with strain wave propagation and, hence, coordinate measurement.

Another type of digitizer employs an electrical delay line parallel to each coordinate direction about which there are looped the wires of a matrix. This type of digitizer is disclosed in U.S. Pat. No. 3,648,277 to Whetstone et al for a Magnetic Graphical Data Device. Pulses are induced in the delay line and the delay time between the induction of a pulse in the delay line and the reproduction of the pulse at the end of the delay line is used to derive the corresponding coordinate of a signal generating stylus. However, since delay lines having a length on the order of digitizer tablet dimensions generally include delay circuitry at discrete points therealong with signals traveling almost instantaneously between the delay points, resolution of coordinate measurement is severely limited by the characteristics of the delay line. The previous type of digitizer is therefore unsuitable for use in applications requiring high precision coordinate measurement on tablet surfaces of relatively small dimension.

DISCLOSURE OF THE INVENTION

In order to overcome the aforementioned problems of prior art magnetostrictively operated position determining devices, the present invention teaches a digitizer construction which employs only a single length of a non-electrical signal propagation medium, i.e. a magnetostrictive medium, for each coordinate dimension and a grid including a plurality of spaced parallel electrical conductors, each transversely extending from a point adjacent one of said magnetostrictive elements so as to permit measurement of strain wave travel time along each single magnetostrictive element between a reference position and a position corresponding to the location of a pointer on the grid. More specifically, the instant invention teaches a construction for an automatic coordinate determining device having a tablet with a grid of parallel spaced electrical conductors and a magnetostrictive element having an axis transverse to the conductors, a pointer movable adjacent the conductors and including a flux producing element inductively coupled to at least one and preferably a group of adjacent parallel conductors, means for energizing the flux producing element to induce an electrical current in the adjacent conductors in such a manner that the current, in turn, induces a strain wave in the magnetostrictive element at a region adjacent the conductor from which the strain wave travels along the axis of the magnetostrictive element, and a timer responsive to the arrival of the strain wave at a predetermined reference position along the axis of the magnetostrictive element for producing a coordinate signal having a characteristic indicative of the position of the pointer on the tablet. There are also disclosed means for continuously magnetically biasing an inductive element positioned in close proximity to the reference position for sensing the arrival of the strain wave at the reference position. Further biasing means is disclosed for periodically restoring the operating characteristic of the magnetostrictive element, thereby compensating for hysteresis and external effects which could affect strain wave propagation times. Additional means are disclosed for generating magnetostrictive strain waves at fixed reference points along the magnetostrictive element contemporaneous with the generation of a strain wave producing signal for providing stop and start signals for the timer for measuring pointer coordinates as well as providing calibration signals for verifying and correcting, when necessary, digitizer accuracy. In the present digitizer, unlike in the prior art, signals travel along a grid of wires at approximately the speed of light and are then propagated along a single magnetostrictive element. In the prior art, travel along the grid elements is at the speed of sound in the magnetostrictive elements and at the speed of light only in a single transverse conductor.

It is therefore an object of the invention to provide an automatic coordinate determining device for determining coordinate distances which requires the use only one magnetostrictive element for each coordinate direction having a length no greater than the dimension of the device tablet in the direction.

Another object of the invention is to provide an automatic position determining device having a tablet the surface of which can be used to support a record medium which can be written upon without affecting position measurement.

Still another object of the invention is to provide an automatic coordinate determining device which can be automatically calibrated as frequently as desired.

A further object of the invention is to provide an automatic coordinate determining device having a single magnetostrictive element, for each coordinate direction, which can be automatically biased, as necessary to compensate for hysteresis and other external effects.

Other and further objects of the invention will be apparent from the following drawings and descriptions of a preferred embodiment of the invention in which like reference numerals are used to indicate like parts in the various views.

DETAILED DESCRIPTION OF THE PREFERRED EMBODIMENT

Figure 1:
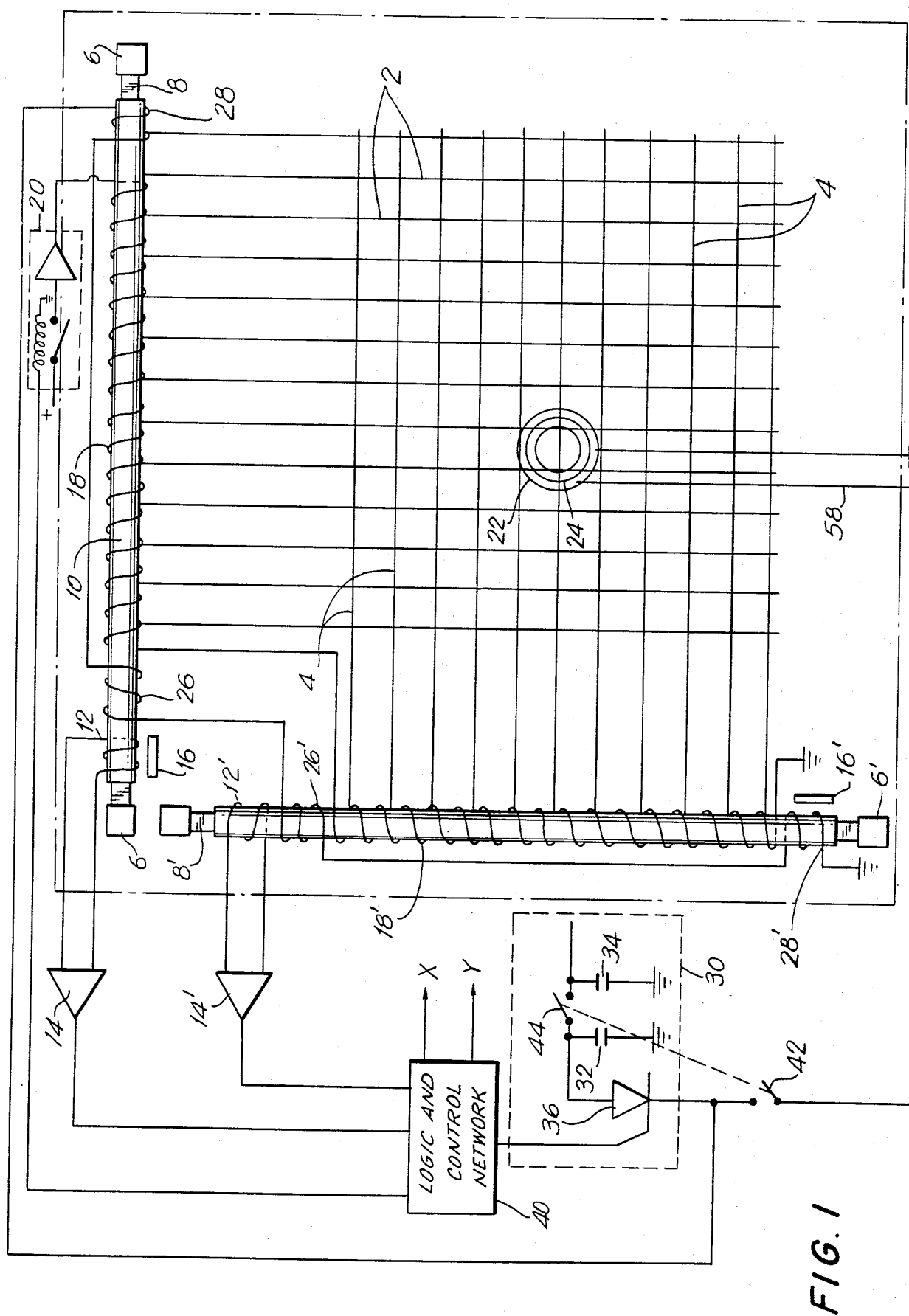
FIG. 1 is a plan view of the preferred embodiment of the improved position determination device of the invention with some of the components shown in schematic form.
Figure 1A:
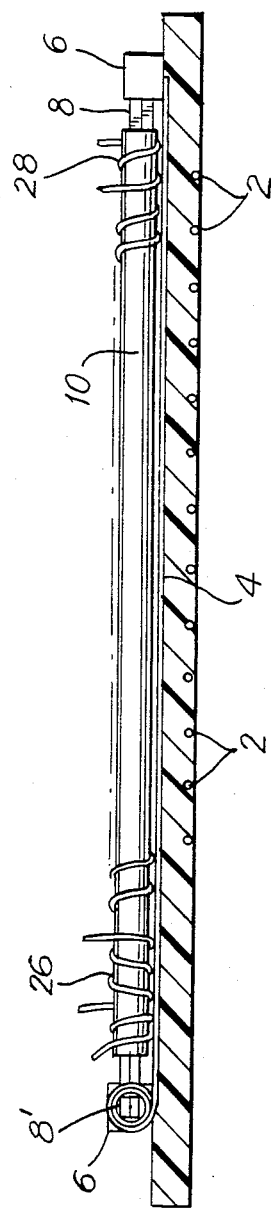
FIG. 1a is partial sectional elevation view of the preferred embodiment of the invention.

Referring now to FIG. 1 of the drawings there is shown a tablet having embedded beneath its surface a grid of electrical conductors 2 which are in parallel equidistantly spaced relationship. The parallel electrical conductors 2 run vertically and are spaced from one another in the horizontal direction in the view of FIG. 1. For convenience the horizontal direction will be termed the x direction while the vertical direction will be termed the y direction. A second grid of parallel equidistantly spaced conductors 4 running in the x direction and spaced along the y direction is disposed slightly beneath the grid formed by the conductors 2 so that none of the conductors 2 make electrical contact with any of the conductors 4. The electrical conductors 2 and 4 extend over the entire area of the tablet surface in which coordinate measurement or digitizing is to take place.

Supported at either of its ends in damping mounts 6 is an elongated magnetostrictive element 8 which has an axis transverse to and which is supported in close proximity or in physical contact with but does not make electrical contact with the electrical conductors 2. The magnetostrictive element 8 is formed from a composition which exhibits magnetostrictive properties such as a nickel-chromium-vanadium or iron-cobalt-vanadium alloy. Upon passage of an electrical current through any of the electrical conductors 2, the resulting electromagnetic field in the region where the energized conductor is proximate to the magnetostrictive element 8 results in the formation of a vibration or strain wave in the magnetostrictive element 8 which propagates along the axis of the magnetostrictive element 8 in opposite directions from the region of proximity between the magnetostrictive element 8 and energized conductor 2. The magnetostrictive element 8 is sheathed in an elongated tubular jacket or sleeve 10 which is preferrably made of a low friction material. Teflon has been found to be a material suitable for sheathing the magnetostrictive element 8 without substantial damping of the magnetostrictively induced strain waves.

Proximate the leftmost end of the magnetostrictive element 8 in the view of FIG. 1 at a predetermined position there is an inductive coil 12 which circumscribes the magnetostrictive element 8 and which is connected to the input of an amplifier 14. A permanent magnet 16 is disposed in predetermined spaced relationship to and with its major axis parallel to the common axis of the coil 12 and magnetostrictive element 8 to magnetically bias the portion of the magnetostrictive element 8 within the coil 12 which, with the amplifier 14, forms a sensor so that the output of the amplifier 14 in response to the arrival of a propagated magnetostrictive strain wave has a predetermined polarity and amplitude range.

The entire length of the sheath or jacket 10 is wrapped within a conducting helical coil 18 preferably formed from a good conductor such as copper. One end of the helical coil 18 is connected to the output of a bias signal generator 20. The opposite end of the bias coil 18 can be connected to ground. Application of a bias signal from the generator 20 to the coil 18 sets up an electromagnetic field about the magnetostrictive element 8 which restores the magnetostrictive element 8 to an initial operating state and compensates for hysteresis or other external effects which can cause the magnetostrictive element 8 to vary in its strain wave propagation response to electric current induced in the conductors 2. The biasing circuitry including the bias signal generator 20 and coil 18 obviate the need for "wiping" the surface of the grid tablet with an elongated magnet as is typically required with prior art digitizers which employ magnetostrictive elements. Since in the instant invention only one magnetostrictive element is needed for each coordinate direction, only one biasing coil need be employed for each coordinate direction. Biasing of the magnetostrictive element 8 takes place before the pointer measurement cycle is initiated. The biasing operation may be performed before each measurement cycle or periodically between groups of several measurement cycles. The biasing can be done independently of the timing of the measurement signals.

Freely moveable over the surface of the digitizer tablet is a pointer device 22 which can be either a stylus or a cursor. The pointer 22 includes a circular coil 24 having an axis normal to the plane of the grid conductors 2 and 4. The coil 24, as a result of its closely spaced proximity to the surface of the tablet, is inductively coupled to individual ones of the conductors 2 and 4 which are adjacent to the coil 24. The pointer coil 24 acts as the primary of a transformer with each of the grid wires 2 and 4 serving as secondaries.

Circumscribing the magnetostrictive element 8 at predetermined reference positions adjacent each end of the magnetostrictive element 8 are fiducial signal generating induction coils 26 and 28. The fiducial signal generating induction coils 26 and 28 are preferably but not necessarily connected in series as is shown in FIG. 1.

The coil 24 of the pointer 22 and the fiducial signal generating induction coils 26 and 28 are energized by a common firing circuit 30 in order to induce signals in the secondaries. Alternatively, the grid wires 2 and 4 can be energized, thereby serving as primaries with the cursor coil 24 being a secondary winding. In the latter case the firing circuit 30 would be connected to the coil 12 and the amplifier 14 to the coil 24. The former arrangement has been found preferable to the latter. The firing circuit 30 includes capacitors 32 and 34 which are connected to the anode of a silicon controlled rectifier (SCR) 36. The cathode of the silicon controlled rectifier 36 is connected to a series circuit including the fiducial signal induction coils 26 and 28 and to the pointer coil 24. The gate terminal of the silicon controlled rectifier 36 is connected to a logic and control network 40 which can produce pulses at a fixed frequency which in the preferred embodiment of the invention is 100 hertz. At a predetermined point in each cycle of the signal output of the control circuit 40, a pulse applied to the gate electrode which is lower than the cathode potential of the SCR 36 causes the SCR 36 to conduct, thereby permitting the capacitors 32 and 34 to discharge through the pointer coil 24 and the fiducial signal induction coils 26 and 28. When the SCR 36 conducts, an electrical pulse appearing at each of the fiducial signal generating induction coils 26 and 28 produces a strain wave in the adjacent region of the magnetostrictive element 8. The strain waves translate toward the coil 12 and upon arrival at the position on the magnetostrictive element 8 circumscribed by the coil 12, cause an electrical pulse signal to be generated at the output of the coil 12 which pulse signal is amplified by the x coordinate signal amplifier 14. Part of the current conducted through the SCR 36 is routed through the coil 24, thereby inducing a corresponding current in those conductors 2 which are closest to the coil 24.

The fiducial signal generating coils 26 and 28 serve to induce respective fiducial magnetostrictive pulses on the magnetostrictive element 8 which can be used to stop and start a counter 90 (FIG. 3) as will subsequently be explained. The fiducial pulses can also be used for automatically calibrating the position determination device of the invention.

During calibration of the position determination device or digitizer, only the voltage stored in the capacitor 32 is applied to the serially connected fiducial signal generating coils 26 and 28. The voltage charge in capacitor 34 is reserved for the coil 24 of the pointer 22. A double-pole single-throw switch having one contact arm 42 in series between the SCR 36 and pointer coil 24 and another switching arm 44 between the capacitor 34 and SCR 36 can be opened to interrupt current flow from the capacitor 34 to the SCR 36 and from the SCR 36 to the coil 24. Switching of the contact switching arms 42 and 44 can be done manually by means of a conventional switch or can be accomplished automatically by a time-controlled switch operating in synchronism with the cyclic coordinate measurement output signals from the control network 40.

Figure 3:
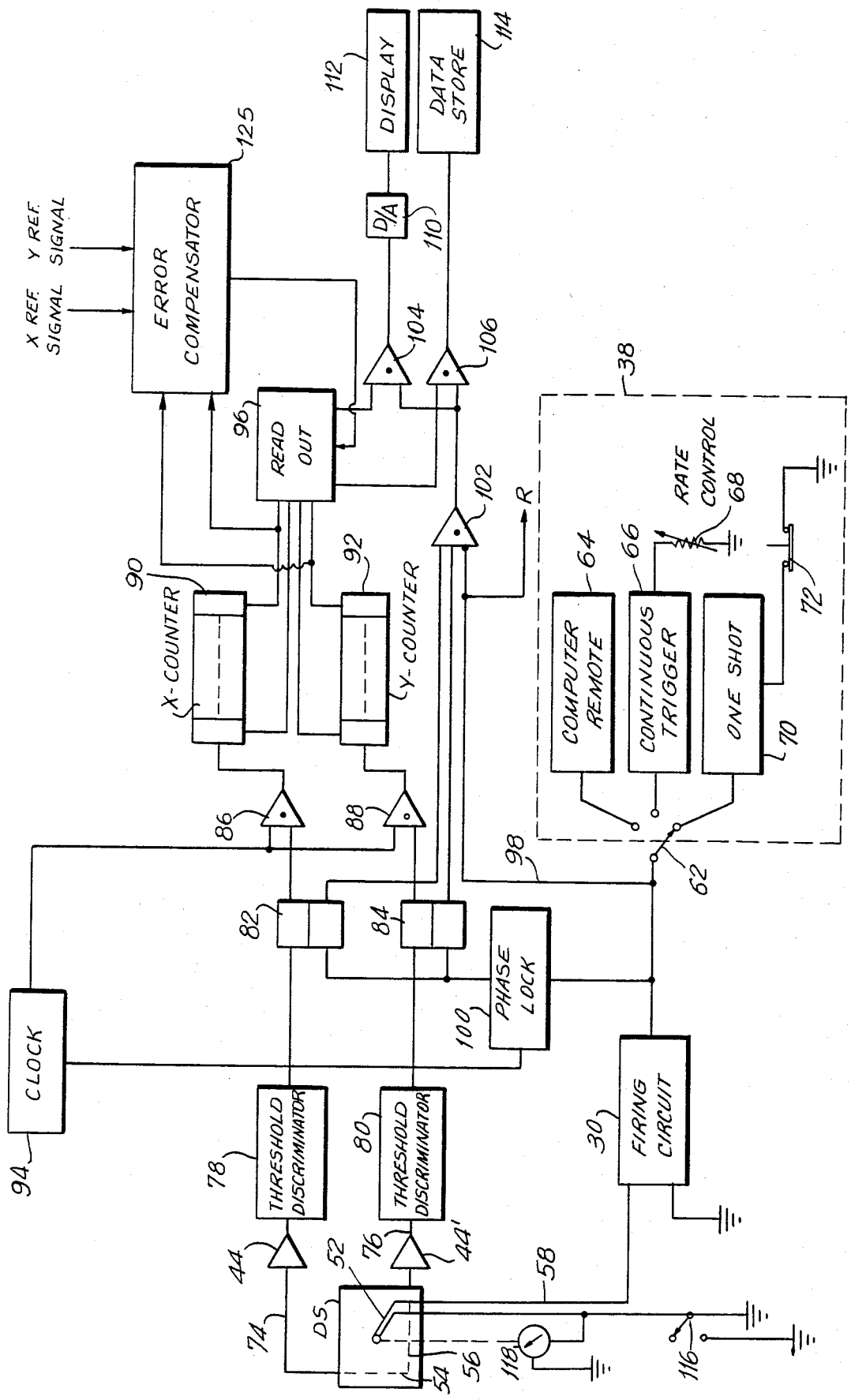
FIG. 3 is a schematic block diagram of the electrical circuitry of the preferred embodiment of the invention.

Since the positions of the fiducial signal generating coils 26 and 28 are fixed and each of their coordinates in the direction parallel to magnetostrictive element 8 is predetermined, the time measured between arrival of pulses simultaneously generated by the coils 26 and 28 at the sensor coil 12 can be used to generate an error signal for applying a scaling factor to a coordinate readout 96 (FIG. 3). With the switch contact arms 42 and 44 open, the firing network 30 can send a negative signal to the gate of the SCR 36, thereby causing only the capacitor 32 to discharge only through the coils 26 and 28. The magnetostrictive strain wave induced in the magnetostrictive element 8 by coil 26 then propagates along the magnetostrictive element 8 toward the region on the magnetostrictive element 8 circumscribed by the coil 12. When the strain wave reaches the coil 12 a voltage is induced therein which is amplified by the amplifier 14 and then used to turn on the counter 90. The counter 90 begins to count until a second voltage pulse induced in the coil by the arrival of the strain wave propagated along the magnetostrictive element 8 from the contemporaneously energized coil 28 stops the counter 90 from counting. The count in the counter 90 is then compared with a reference signal value corresponding to an ideal standard elapsed time between arrival of reference signals from the fiducial signal generating coils 26 and 28 at the sensor coil 12. The logic and control network 40 then produces an error signal having a magnitude proportional to the difference between the reference signal value and the count in the counter 90, and applies it to adjust the counter signals input to the readout 96 to correct for any error which results in deviation of the fiducial pulse interarrival time from the ideal standard reference value.

In order to determine the x coordinate of the pointer 22, the magnetostrictive reference pulse induced as a result of energization of the fiducial signal coil 26 can be used to start the x counter 90, and the magnetostrictive pulse induced as a result of energization of the conductors adjacent the pointer 22 which are energized by inductive action with the cursor coil 24, can be employed to stop the x counter 90. The time between the arrival of the propagated magnetostrictive strain waves at the sensor coil 12 is proportional to the distance of the pointer 22 from the sensor coil 12 in the x direction. The x coordinate distance measured from the conductor 2 which is transverse to the magnetostrictive element 8 adjacent the coil 12 can therefore be determined by the processing circuitry of the logic and control network 40 from the measured count indicative of the time between respective arrivals of the fiducial signal from coil 26 and the signal induced by the pointer 22 as will be known to those skilled in the art. If the fiducial pulse from the coil 26 is used to start the timer and the pulse generated as a result of energization of the cursor coil 24 is used to stop the counter 90, the logic and control network 40 can be programmed by conventional means to ignore, during the measurement cycles, the sensing at the coil 12 of the magnetostrictive strain wave induced as a result of energization of the fiducial signal generating coil 28.

Alternatively, the magnetostrictive strain wave induced as a result of energization of the cursor coil 24 can be used to start the counter 90 and the magnetostrictive strain wave induced by energization of the fiducial signal generating coil 28 can be used to stop the counter 90 when its arrival is sensed at the sensor coil 12. In automatic operation, the logic and control network 40 is adjusted so that the counter 90 does not begin to count in response to the arrival of the magnetostrictive strain wave at the sensor coil 12 which is induced by energization of the fiducial signal generating coil 26. The latter method has been found preferable and is employed in the preferred embodiment of the invention although the former method of using the first fiducial pulse to start the counter does provide satisfactory results.

Figure 2:
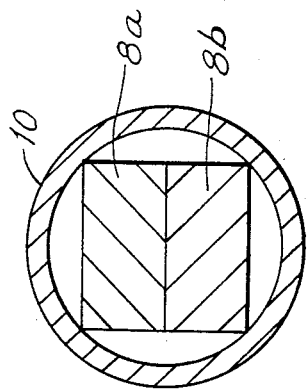
FIG. 2 is a cross sectional view of a component of the preferred embodiment of the improved position determining device of the invention.

In order to prevent the strain waves on magnetostrictive element 8 from being reflected back after they reach the end of the magnetostrictive element 8 adjacent the sensor coil 12 and are sensed by the sensor coil 12, the damping elements 6 in which the ends of the magnetostrictive element 8 are supported, can be formed from a combination of felt material and a hard rubber. This combination of materials has been found suitable for sufficiently damping pulses arriving at the end of the magnetostrictive element 8 adjacent the sensor coil 12 so that the amplitude of any reflections is well below the threshold amplitude to which the sensor coil 12 and amplifier 14 will respond to provide an output pulse of sufficient amplitude to activate the circuitry of the control network 40. Damping need only be provided at the end of the magnetostrictive element 8 adjacent the sensor coil 12 if the element is supported close to the coil since reflections from the opposite end of the magnetostrictive element 8 will indicate a coordinate distance beyond the maximum coordinate dimension of the tablet. Such reflections will abate before the following measurement cycle occurs. In order to insure that strain waves of sufficient amplitude are generated to permit discrimination by a logic and control network threshold discriminator 78 of fiducial and pointer generated pulses from extraneous signals which may appear on the line, the magnetostrictive element 8 may be formed from two elongated bands of magnetostrictive material having a rectangular cross section as shown in FIG. 2. The bands 8a and 8b are placed in intimate contact and then sheathed in a teflon jacket or sleeve as previously described.

The digitizer illustrated in FIG. 1 provides for measurement of two orthogonal coordinates, one of which has been termed the x coordinate in the previous description and a second coordinate, which is termed the y coordinate. To determine the y coordinate a second magnetostrictive element 8' is positioned orthogonally to the magnetostrictive element 8 and supported in dampers 6'. The magnetostrictive element 8' is sheathed in a teflon jacket 10' and surrounded by a helical biasing coil 18' which is preferably although not necessarily connected in series with the helical biasing coil 18 so that a single biasing current serves to clear and restore both magnetostrictive elements 8 and 8'.

Fiducial signal generating coils 26' and 28' are preferably connected in series with the fiducial signal generating coils 26 and 28 so that a single pulse output from the SCR 36 can be used to energize all of the fiducial signal generating coils simultaneously. When very high measurement repetition rates are desired it may be necessary to compensate for delays in current flow among the conductors 2 and 4 associated with the respective fiducial signal generating coils by appropriate delay means the application of which will be known to those skilled in the art.

A y coordinate sensor coil 12' and amplifier 14' are provided for sensing the magnetostrictive strain waves that are propagated along magnetostrictive element 8', to determine a y coordinate.

The cursor coil 24 and fiducial signal generating coils 26, 28, 26' and 28' are energized simultaneously by conduction of the SCR 36. Hence the x and y coordinate measurements are accomplished in parallel by the logic and control network 40 which will now be described with reference to FIG. 3. As was explained above, the pointer 22 may be in the form of a stylus or cursor having a coil 24 or other field generating means adjacent the lower end or surface thereof and coupled by means of a conductor 58 to a firing circuit which includes the SCR 36 and capacitors 32 and 34. The firing circuit 30 is in turn actuated by means of triggering pulses derived by any suitable means from an external source 38. The manner of introduction of trigger pulses may be controlled by means of a multiple position switch 62. For example, a computer or like remote control source 64 may be employed to provide triggering pulses, a continuous trigger circuit 66 may be provided in cooperation with a rate control 68 for varying the frequency of the actuating pulses, or a manually operated signal pulse control circuit such as a one-shot monostable multivibrator 70 may be provided with a manually operated switch 72 for providing a manually controlled pulse rate from the one shot 70. The continuous trigger 66 and one shot 70 may be of conventional form, and the computer-controlled signal may be derived from a computer or from any external source of triggering signals.

The x and y generated magnetostrictive disturbances are picked up by the sensor coils 12 and 12', amplified by the amplifiers 14 and 14', and applied to threshold discriminators 78 and 80. The threshold discriminators 78 and 80 operate to sense the first zero crossing, after the achievement of a minimal threshold and provide an output pulse corresponding to the occurrence of the zero crossing signal. The outputs of the threshold discriminators 78 and 80 are coupled to the respective inputs of conventional bistable flip flops 82 and 84. One output of each flip flop 82 and 84 is gated through a coincidence gating network such as an AND gate 86 and 88 into an x channel counter 90 and a y channel counter 92 respectively. The gates 86 and 88 also respectively receive a clock input from a clock pulse generator 94. The counters 90 and 92 are each coupled to a read out device 96 with a transfer register. The signal which is used to fire the SCR 36 is also conducted simultaneously along a line 98 to a reset terminal R whereat the leading edge of the trigger pulse is employed to reset the counters 90 and 92 in a conventional manner. At the same time, the trigger signal is conducted simultaneously to each of the flip flops 82 and 84 through a phase lock circuit 100. The phase lock circuit 100 delays the triggering of the flip flops 82 and 84 for time periods sufficient to insure that a full width clock pulse is provided from the clock pulse generator 94 to the gates 86 and 88. The effect of the trigger signal on the flip flops 82 and 84 is to set each flip flop in a state permitting the gates 86 and 88, coupled thereto, to pass clock pulses from the clock source 94. As a result, the x counter and y counter each begin to accumulate a digital count. The count continues to accumulate until the appropriate signal is received from the threshold discriminator 78 and 80 corresponding to the first zero crossing after passage of the minimum threshold level set in the threshold discriminator circuits. Detection of a pulse at this point by the threshold discriminators 78 and 80 serves to reset the flip flops 82 and 84, thereby blocking the action of the gates 86 and 88 and causing a cessation of the counter accumulation. The period between the trigger pulses is sufficient to allow the x axis and y axis received signals to damp out prior to initiation of the next successive trigger pulse. The counter reset operation as described above is effective on the leading edge of the trigger pulse and the unblocking of the AND gates on the trailing edge.

The complementary outputs of the flip flops 82 and 84 are respectively coupled to a further AND gate 102. The AND gate 102 is coincidentally enabled only during the period after the counter accumulation is complete but before the counters have been reset by the trigger pulse. This provides a "data ready" signal which may be utilized for transferring the accumulated count to an appropriate output device by means enabling the coincidence gates 104 and 106. For purposes of illustration, the gate 102 may be employed in conjunction with an externally applied signal conveyed through the readout circuit 96 to energize either gate 104 or 106 when it is desired to make specific use of the information. For example, energization of gate 104 will permit the information to flow to a digital to analog conversion circuit 110 for conversion to a signal suitable for display on a suitable display device 112. A display device may be a conventional form of cathode ray tube display. Alternatively, it may be desired to store the information in a computer or other form of permanent data store, in which event the gate 106 would be enabled with a readout supplied from the readout circuit 96 through the data storage device 114.

As shown in FIG. 3, an error compensator network 125 can receive output signals from the x and y counters 90 and 92 in response to the pulsing of the magnetostrictive element 8 and 8' by the fiduciary signal pulses. The error compensator circuit includes a comparator which compares the counts between the arrival of the fiducial signal pulses at the sensors with predetermined x and y reference signals and provides feedback signals to the x and y counters depending on the deviation of the x and y counts from the x and y reference signals.

Resolution of the system is a function of the clocking frequency and not of the spacing between adjacent parallel electrical conductors 2 and 4. However it is desirable to have the spacing between parallel electrical conductors small so as to insure that at least one and preferably several conductors are always closely proximate the pointer coil 24 to insure reliable signals and to minimize signal amplitude bounce as the pointer is moved across the surface of the tablet. Hence the conductor spacing should be a function of the diameter of the coil 24. In the case of a cursor which employs a relatively large coil 24, greater spacing can be used than when a stylus is to be used as the pointer, in which case the coil is apt to be substantially smaller.

The velocity of the strain wave along the magnetostrictive elements 8 and 8' is approximately 5,000 meters per second. Hence the strain wave travels approximately 0.01 inches in 50 nanoseconds. Since 50 nanoseconds is the period of the 20 MHz clock 94, it is possible to resolve up to 100 lines per inch with the 20 MHz clock 94. Increasing the frequency of the clock 94 increases the resolution of the system. For example, a 200 MHz clock would allow resolution on the order of 1,000 lines per inch. As a result of the use of a non-electrical signal propagation medium, i.e., a magnetostrictive element, the signal is propagated with a continuous, uniform velocity and, hence, the resolution of the system is limited only by the frequency of the clock 94 and is independent of the characteristics of the signal propagation medium.

As a result of the built-in calibration function which is enabled by the use of the pulsing of fiducial signal generating coils 26, 28, 26' and 28', it is possible to automatically determine the size of the tablet in use. Hence a single logic control circuit can be employed in the system irrespective of the tablet size. The automatic fiducial testing circuitry can be used to provide appropriate scale factors to correct for temperature errors and other errors which may occur as, for example, if the paper on which coordinates are to be measured is stretched or otherwise of incorrect scale. Errors attributed to temperature and incorrect scaling of the paper can be expected to be within pre-determined limits. Differences in the arrival times between fiducial pulses attributable to differently sized tablets can be expected to be substantially larger. Hence the logic circuit 40 can be adapted to determine ranges of interval times for fiducial calibration pulses and, depending upon the range into which the interfiducial pulse time falls, the tablet can be deemed to be of a predetermined dimension corresponding to the detected range. Separate range determination can be made for the x and y directions so that, for example, a 14-inch by 14-inch tablet can be distinguished from a 14-inch by 17-inch tablet. Once a tablet's dimensions are automatically determined, appropriate scaling can then be applied to correct for smaller deviations which would be attributable to temperature and scale errors.

It is to be understood that the foregoing description is of a preferred embodiment of the invention to which variations and modifications can be made without departing from the spirit the scope of the invention which is set forth in the following claims.

I claim:

1. An automatic coordinate determining device comprising:
    a tablet having a grid of parallel spaced electrical conductors, and a magnetostrictive element with an axis transverse to said conductors,
    a pointer movable over a surface of said tablet and including a flux producing element inductively coupled to at least one of said parallel conductors,
    means for energizing said flux producing element to induce an electrical current in said one conductor, said current in turn inducing a first strain wave in said magnetostrictive element at a region adjacent said one conductor, said strain wave being propagated along said axis, and first reference signal generating means for introducing a second strain wave at a first reference position along said axis at a determined time relative to the energizing of said flux producing element, and
    a timer responsive to the arrival of said first and second strain waves at a second predetermined reference position along said axis for producing a coordinate output signal having a characteristic indicative of the position of said pointer on said tablet, and
    second reference signal generating means inductively coupled to said magnetostrictive element at a third predetermined position therealong for inducing a third strain wave in said magnetostrictive element.

2. Apparatus according to claim 1 further comprising sensing means for generating an arrival signal in response to the arrival of said first strain wave at said second predetermined reference position, said timer being responsive to said arrival signal.

3. Apparatus according to claim 2 wherein said sensing means comprises an inductive element inductively coupled to said magnetostrictive element adjacent said second reference position for producing a voltage in response to the arrival of said strain waves at said predetermined second reference position.

4. Apparatus according to claim 3 further comprising means for biasing said magnetostrictive element.

5. Apparatus according to claim 4 wherein said biasing means comprises a magnet.

6. Apparatus according to claim 1 further comprising means for actuating said first and second reference signal generating means to produce a fourth and said third strain waves, said timer being responsive to said third and fourth strain waves for producing a test signal indicative of the time between arrival of said third and fourth strain waves at said second predetermined reference position,
error signal producing means for comparing said test signal with a predetermined calibration signal and producing an error signal responsive to the difference between said test signal and said calibration signal, said timer means being responsive to said error signal for providing compensation to said coordinate output signal.

7. Apparatus according to claim 1 wherein at least one of said first and second reference signal generating means includes a capacitor, a normally open circuited switching device, and
an inductor connected in series with said switching device and said capacitor for discharging said capacitor through said inductor when said switching device is actuated to a closed circuit condition.

8. Apparatus according to claim 7 wherein said switching device comprises a silicon controlled rectifier.

9. Apparatus according to claim 1 wherein said first and second reference signal generating means include respective elements connected in series.

10. Apparatus according to claim 1 further comprising means for applying magnetic bias to said magnetostrictive element prior to energization of said flux producing element.

11. Apparatus according to claim 10 wherein said biasing means includes a coil circumscribing said magnetostrictive element, and
means for energizing said coil.

12. Apparatus according to claim 1 wherein said magnetostrictive element is disposed in a sheath made of low friction material.

13. Apparatus according to claim 12 wherein said material includes teflon.

14. Apparatus according to claim 1 wherein said magnetostrictive element comprises a plurality of lengths of a magnetostrictive medium disposed in mutually close proximity.

15. An automatic coordinate determination device comprising:
a tablet having an x grid of parallel spaced electrical x conductors, and an x magnetostrictive element having an axis transverse to said conductors,
a y grid of parallel spaced electrically conductors transverse to the spaced electrical x conductors and a y magnetostrictive element having an axis transverse to the y conductors,
a pointer movable over a surface of said tablet and including a flux producing element inductively coupled to at least one adjacent x and y conductor of each of said x and y grids,
means for energizing said flux producing element to induce an electrical current in said adjacent x and y conductors, said current in turn inducing first respective strain waves in each of said x and y magnetostrictive elements at respective regions adjacent said respective x and y conductors, said strain waves traveling along said respective axes, said energizing means further comprising x reference and y reference signal generating means inducing second respective strain waves at first determined positions of said x and y magnetostrictive elements at determined times with respect to the inducing of current in the respective said x and y conductors,
a timer responsive to the arrival of each of said first and second strain waves at respective second predetermined x and y reference positions along said respective axes for producing respective x and y coordinate signals having respective characteristics indicative of x and y coordinates of said pointer with respect to said tablet,
second x reference signal generating means inductively coupled to said x magnetostrictive element at a third predetermined position therealong for inducing a third x strain wave in said x magnetostrictive element, and
second y reference signal generating means inductively coupled to said y magnetostrictive element at a third predetermined position therealong for inducing a third y strain wave in said y magnetostrictive element.

16. Apparatus according to claim 15 comprising x sensing means for generating an x arrival signal in response to the arrival of said first x strain wave at said predetermined x reference position along said x magnetostrictive element, and
y sensing means for generating a y arrival signal in response to the arrival of said first y strain wave at said y predetermined reference position along said y magnetostrictive element, said timer being responsive to said sensing means.

17. Apparatus according to claim 16 wherein said first x reference signal generating means is connected to said first y reference signal generating means.

18. Apparatus according to claim 16 wherein said first and second reference x signal generating means are connected in series with said first and second y reference signal generating means.

19. Apparatus according to claim 15 further comprising x biasing means for applying magnetic bias to said x magnetostrictive element prior to energization of said flux producing element, and y biasing means for applying magnetic bias to said y magnetostrictive element prior to energization of said flux producing element, said x and y biasing means being mutually connected.

20. An automatic coordinate determining device comprising a tablet having a grid of parallel spaced electrical conductors, and an elongated magnetostrictive element, said conductors being coupled to said magnetostrictive element to induce strain waves therein at locations corresponding to the locations of the respective conductors in said tablet, in response to currents induced in said respective conductors, a pointer movable over a surface of said tablet and including a flux producing element adapted to be selectively inductively coupled to said conductors, means for substantially simultaneously applying a current to said flux producing element for producing a first strain wave in said magnetostrictive element at the position corresponding to the conductor at that time coupled to the flux producing element and for producing a second strain wave at a first predetermined position of said magnetostrictive element, means for producing first and second signals corresponding to the time of arrival of said first and second strain waves at a second determined position on said magnetostrictive element, and means responsive to the time of occurrence of said first and second signals for providing an output signal corresponding to the location of said pointer on said tablet, and means inductively coupled to said magnetostrictive element for producing a third strain wave in said magnetostrictive element at a third predetermined position therealong.

21. An automatic coordinate determining device comprising:
- a tablet having an x grid of parallel spaced electrical x conductors, and an x magnetostrictive element having an axis transverse to said conductors, and having
- a y grid of parallel spaced electrical y conductors transverse to the spaced electrical x conductors and a y magnetostrictive element having an axis transverse to the y conductors,
- a pointer movable over a surface of said tablet and including a flux producing element inductively coupled to at least one adjacent x and y conductor of each of said x and y grids,
- means for energizing said flux producing element to induce an electrical current in said adjacent x and y conductors, said current in turn inducing first respective strain waves in each of said x and y magnetostrictive elements at respective regions adjacent said respective x and y conductors, said strain waves traveling along said respective axes, said energizing means further comprising x reference and y reference signal generating means inducing second respective strain waves at first determined positions of said x and y magnetostrictive elements at determined times with respect to the inducing of current in the respective said x and y conductors,.
- a timer responsive to the arrival of each of said first and second strain waves at respective second predetermined x and y reference positions along said respective axes for producing respective x and y coordinate signals having respective characteristics indicative of the x and y coordinates of said pointer with respect to said tablet, and
- means for substantially simultaneously applying a third strain wave to said first determined position of said respective magnetostrictive element and a fourth strain wave to a third determined position of said respective magnetostrictive element, and means responsive to the arrival of said third and fourth strain waves at said second determined position for providing a correction signal corresonding to the delay characteristics of said magnetostrictive element.

* * * * *

UNITED STATES PATENT AND TRADEMARK OFFICE
CERTIFICATE OF CORRECTION

PATENT NO. : 4,514,688
DATED : April 30, 1985
INVENTOR(S) : ALBERT L. WHETSONE

It is certified that error appears in the above-identified patent and that said Letters Patent is hereby corrected as shown below:

```
Column 11, line 67, change "electrically" to
-- electrical y --.
```

Signed and Sealed this

Eighth Day of July 1986

[SEAL]

Attest:

DONALD J. QUIGG

Attesting Officer

Commissioner of Patents and Trademarks